(12) United States Patent
Iwashita et al.

(10) Patent No.: US 8,040,097 B2
(45) Date of Patent: Oct. 18, 2011

(54) SERVO MOTOR DRIVE CONTROL DEVICE FOR CALCULATING CONSUMED ELECTRIC ENERGY AND REGENERATED ELECTRIC ENERGY

(75) Inventors: Yasusuke Iwashita, Yamanashi (JP); Tadashi Okita, Yamanashi (JP); Hiroyuki Kawamura, Yamanashi (JP); Yuuya Ueno, Yamanashi (JP)

(73) Assignee: Fanuc Ltd, Yamanashi (JP)

( * ) Notice: Subject to any disclaimer, the term of this patent is extended or adjusted under 35 U.S.C. 154(b) by 225 days.

(21) Appl. No.: 12/554,167

(22) Filed: Sep. 4, 2009

(65) Prior Publication Data

US 2010/0072940 A1 Mar. 25, 2010

(30) Foreign Application Priority Data

Sep. 24, 2008 (JP) ................................ 2008-244364

(51) Int. Cl.
*G01R 21/00* (2006.01)
(52) U.S. Cl. .................... 318/565; 318/558; 318/625
(58) Field of Classification Search .................. 318/86, 318/87, 375, 376, 440, 490, 500, 558, 565, 318/625, 650; 388/909
See application file for complete search history.

(56) References Cited

U.S. PATENT DOCUMENTS

| | | | | |
|---|---|---|---|---|
| 3,775,651 A | * | 11/1973 | Graf et al. | 318/802 |
| 4,035,715 A | * | 7/1977 | Wyman et al. | 323/268 |
| 6,441,581 B1 | * | 8/2002 | King et al. | 320/101 |
| 6,526,360 B1 | | 2/2003 | Ito et al. | |
| 7,194,339 B2 | | 3/2007 | Kakegawa | |

FOREIGN PATENT DOCUMENTS

| | | |
|---|---|---|
| DE | 69629241 T2 | 4/2004 |
| EP | 0743745 A2 | 11/1996 |
| EP | 1020279 A1 | 7/2000 |
| JP | 4025485 U | 2/1992 |
| JP | 2000105605 A | 4/2000 |
| JP | 2000206150 A | 7/2000 |
| JP | 2000299901 | 10/2000 |
| JP | 2002192588 | 7/2002 |
| JP | 2005313610 A | 11/2005 |

OTHER PUBLICATIONS

German Office Action for Application No. 10 2009 042 905.0-35, issued Dec. 7, 2010.
Notice of Reasons for Rejection for Japanese Application No. 2008-244364 issued May 11, 2010.

* cited by examiner

*Primary Examiner* — Bentsu Ro
(74) *Attorney, Agent, or Firm* — Lowe Hauptman Ham & Berner LLP (57) ABSTRACT

A mechanical system includes a plurality of amplifier groups each having a common power source unit connected to a higher-level power source and a plurality of power supply units for supplying power to servo motors from the common power source unit. A servo motor drive control device of the mechanical system includes a plurality of amplifier group electric power detection units each determining an electric energy of the corresponding one of the amplifier groups. Each of the amplifier group electric power detection units totals individual periodic electric energy dEak of the servo motors connected to the power supply unit associated with the corresponding amplifier group thereby to determine an amplifier group periodic electric energy dEbg representing a consumed electric energy or a regenerated electric energy in the corresponding amplifier group and integrates the determined amplifier group periodic electric energy dEbg over a predetermined time length thereby to determine an amplifier group consumed electric energy Ebng.

6 Claims, 5 Drawing Sheets

SERVO MOTOR DRIVE CONTROL DEVICE FOR CALCULATING CONSUMED ELECTRIC ENERGY AND REGENERATED ELECTRIC ENERGY

RELATED APPLICATIONS

The present application is based on, and claims priority from, Japanese Application No. 2008-244364, filed Sep. 24, 2008, the disclosure of which is hereby incorporated by reference herein in its entirety.

BACKGROUND OF THE INVENTION

1. Field of the Invention

The present invention relates to a servo motor drive control device having a function of calculating consumed electric energy and regenerated electric energy of a mechanical system or especially a machine tool having a plurality of servo motors.

2. Description of the Related Art

Generally, as disclosed, for example, in Japanese Unexamined Utility Model Publication No. 4-25485, consumed electric energy of a mechanical system can be determined by connecting a wattmeter to an original power source. Further, in a mechanical system having a plurality of servo motors, it is known that consumed electric energy for each servo motor is determined in more detail, and regenerated electric energy, which may be generated in the servo motors, is also determined.

As such a technique, Japanese Unexamined Patent Publication No. 2000-105605 discloses that consumed electric power and regenerated electric power of each servo motor are determined for each predetermined period from an angular velocity of each servo motor and a measurement value of an electric current flowing through the servo motor and then consumed electric energy and regenerated electric energy are determined by integrating the determined consumed electric power and determined regenerated electric power over a predetermined length of time. Japanese Unexamined Patent Publication No. 2000-105605 states that a proper maintenance/inspection time can be grasped by using the thus determined consumed electric energy and regenerated electric energy to evaluate operating loads for individual axes corresponding to individual servo motors. It is also proposed to try to optimize processes and magnitudes of regeneration resistances corresponding to individual servo motors so as to assure a balance of loads between the axes.

Japanese Unexamined Patent Publication No. 2000-206150 discloses that consumed electric energy per product manufacture cycle is determined for each power consuming element such as a servo motor or a heater of an injection molding machine. This reference states that it makes it possible to accurately determine the product manufacturing cost or to evaluate an effect that the operation condition of the machine has on the consumed electric energy to thereby try to effectively utilize the electric power.

Japanese Unexamined Patent Publication No. 2005-313610 discloses that consumed electric power of motors of a paper feed mechanism and carriage drive mechanism is monitored in a printer to suppress an adverse effect due to heat of the motors.

Please note that in Japanese Unexamined Patent Publication No. 2000-206150 and Japanese Unexamined Patent Publication No. 2005-313610, the consumed electric power of the servo motor is determined from the measurement value of the electric current of the servo motor.

In a mechanical system having a lot of servo motors, a power source configuration may be employed in which the servo motors are divided into a plurality of groups and a plurality of the servo motors associated with each group are connected to a common power source unit. Specifically, this power source configuration includes a plurality of amplifier groups, each of which is configured by one common power source unit, and a plurality of power supply units connected to the common power source unit each for supplying power to each of the plurality of the servo motors, and all of the amplifier groups are connected to a higher-level power source system such as an AC power source network.

In this power source configuration having a plurality of amplifier groups, the evaluation of the consumed electric energy and regenerated electric energy according to the prior art described above is sometimes insufficient. For example, it is impossible to know whether the regenerated electric energy of each servo motor is returned to the AC power source or effectively used by other servo motors. Each of amplifier groups also can employ a different regeneration method, i.e., a resistance regeneration method or a power regeneration, and the regenerated electric energy is sometimes disposed of by the regeneration resistance. As described above, the prior art does not focus attention on clarification of a flow of the regenerated electric energy.

SUMMARY OF THE INVENTION

Accordingly, it is an object of the present invention to make it possible to properly evaluate a flow of consumed electric energy and regenerated electric energy in a mechanical system such as a machine tool of a power source configuration having a plurality of amplifier groups.

In order to achieve the above object, according to the present invention, there is provided a servo motor drive control device controlling servo motors of a mechanical system which includes a plurality of amplifier groups each having a common power source unit connected to a higher-level power source and a plurality of power supply units for supplying power to the servo motors from the common power supply unit, the servo motor drive control device characterized by further including a plurality of individual electric power detection units each determining, at every predetermined period, an individual periodic electric energy representing an electric energy of the corresponding servo motor operating in that period; and a plurality of amplifier group electric power detection units each determining an electric energy of the corresponding one of the amplifier groups, wherein the individual periodic electric energy takes a positive value when the servo motor consumes power and takes a negative value when the servo motor regenerates power; and wherein each of the plurality of the amplifier group electric power detection unit totals the individual periodic electric energy of the servo motors connected to the power supply units associated with the amplifier group corresponding to each amplifier group electric power detection unit thereby to determine an amplifier group periodic electric energy representing a consumed electric energy or a regenerated electric energy in the corresponding amplifier group for each period and integrates the determined amplifier group periodic electric energy over a predetermined time length thereby to determine an amplifier group consumed electric energy representing a total consumed electric energy in the corresponding amplifier group during the predetermined time length.

This configuration makes it possible to evaluate the consumed electric energy and the regenerated electric energy with respect to each amplifier group based on the result of calculation in the amplifier group electric power detection unit.

Each of the plurality of the amplifier group electric power detection units preferably integrates the amplifier group periodic electric energy, only when the amplifier group periodic electric energy is negative, over a predetermined time length thereby to determine an amplifier group regenerated electric energy representing a total sum of the regenerated electric energy in the amplifier group corresponding to the amplifier group electric power detection unit for the predetermined time length. This makes it possible to evaluate the total regenerated electric energy returned to the AC power source by each amplifier group during the predetermined time length.

Preferably, each of the plurality of the amplifier group electric power detection units totals the individual periodic electric energy of the servo motors connected to the power supply units associated with the amplifier group corresponding to the amplifier group electric power detection unit only when the individual periodic electric energy is negative, further integrates the totaled individual periodical electric energy over the predetermined time length thereby to an electric energy, and subtracts the amplifier group regenerated electric energy from the electric energy thus obtained, thereby determining the regenerated electric energy transferred between the servo motors in the amplifier group. This makes it possible to evaluate the regenerated electric energy effectively used in the amplifier group and evaluate the energy saving effect.

Preferably, each of the plurality of the individual electric power detection units is configured so as to determine the individual periodic electric energy based on a measurement value of a current flowing through the corresponding servo motor and a measurement value of a rotational speed of the corresponding servo motor. This makes it possible to simply and properly determine the individual periodic electric energy becoming positive or negative depending on whether it is consumed electric energy or regenerated electric energy, as described above.

Each of the plurality of the individual electric power detection units is also preferably configured to determine an individual consumed electric energy representing an electric energy consumed during a predetermined time length and an individual regenerated electric energy representing a total sum of the regenerated electric energy. This makes it possible to obtain information on the consumed electric energy and the regenerated electric energy of individual servo motors, in addition to the calculation result of the amplifier group electric power detection unit, thereby carrying out more detailed evaluation.

The servo motor drive control device may further include an overall electric power detection unit which calculates information on a total consumed electric energy and a total regenerated electric energy of all the amplifier groups. As a result, information on the electric energy received from the AC power source and the electric energy returned to the AC power source can be further obtained.

The common power source units may include a common power source not performing the regenerating operation by which electric power is returned to the AC power source. In this case, in order to assure proper evaluation, with respect to the amplifier groups associated with the common power supply unit not performing the regenerating operation, the overall electric power detection unit is required to set the amplifier group periodic electric energy to zero when the amplifier group periodic electric energy thereof is negative, i.e., to set the regenerated electric energy from the corresponding amplifier group to zero and then carry out the calculation.

According to the present invention, a flow of consumed electric energy and regenerated electric energy can be properly evaluated in a mechanical system having a power source configuration with a plurality of amplifier groups.

BRIEF DESCRIPTION OF THE DRAWINGS

The above and other objects, features and advantages of the present invention will be described below in more detail based on preferred embodiments of the present invention with reference to the accompanying drawings, in which.

DETAILED DESCRIPTION

Preferred embodiments of the present invention will be described below with reference to the accompanying drawings.

Figure 1:
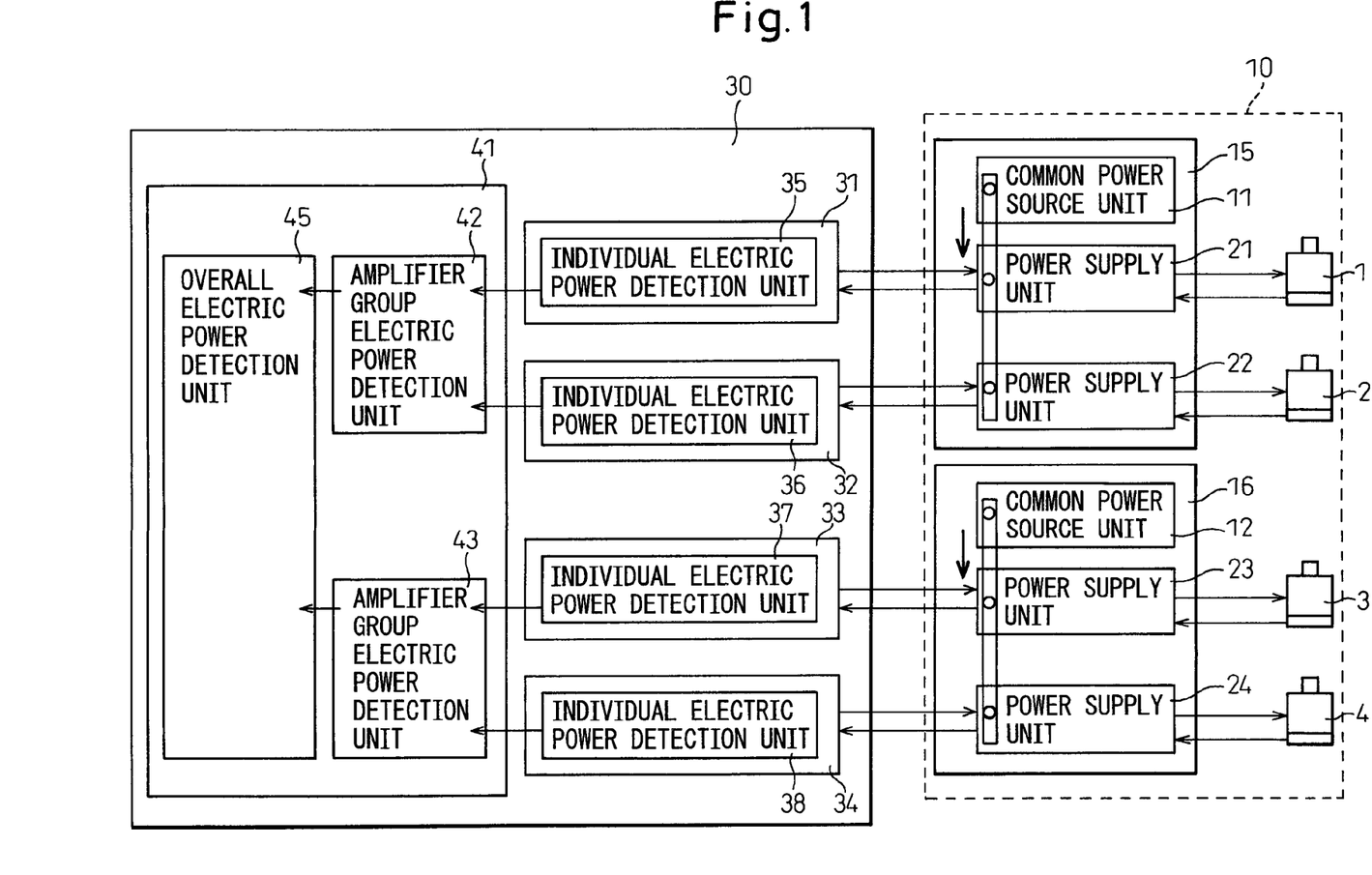
FIG. 1 is a block diagram schematically showing a configuration of a mechanical system and a servo motor drive control device thereof according to an embodiment of the present invention.

FIG. 1 is a block diagram schematically showing a mechanical system such a machine tool which includes a servo motor drive control device according to an embodiment of the present invention and a plurality of servo motors controlled by the servo motor drive control device.

For convenience, only the parts of mechanical system 10 related to the present invention are shown. Further, a configuration of a servo motor drive control device 30 is shown to have a plurality of functional parts such as power supply unit control processing units 31 to 34. These functional parts may be configured as separate hardware or may be realized by software in hardware having sections for the functional parts not defined clearly from each other. In the case where the functional parts are realized by software, individual functional parts may be configured by separate software parts or may be realized by software having sections for the functional parts not defined clearly from each other.

In the example shown in FIG. 1, mechanical system 10 includes four servo motors 1 to 4. Servo motors 1 and 2 are connected to a first common power source unit 11, and servo motors 3 and 4 are connected to a second common power source unit 12.

Common power source units 11 and 12 are connected to a higher-level AC power source (not shown), which may be, for example, a typical AC power source network laid in a factory where mechanical system 10 is installed. Common power source units 11 and 12 function to convert AC power from the AC power source into DC power and supply the converted DC power to power source units 21 to 24 corresponding to servo motors 1 to 4, respectively. One common power source unit 11 and two power supply units 21 and 22 connected thereto constitute a first amplifier group 15, while the other common power source unit 12 and two power supply units 23 and 24 connected thereto constitute a second amplifier group 16.

Each of power supply units 21 to 24 is configured so that when regenerated electric power is generated by servo motors 1 to 4, the regenerated electric power is returned to common power source units 11 and 12. Further, in this embodiment, each of common power source units 11 and 12 is configured so that when regenerated electric power is regenerated in amplifier group 15 or 16 as a whole corresponding to common power source unit 11 or 12, the regenerated electric power can be returned to the higher-level AC power source.

Power supply units 21 to 24 function to convert DC power supplied from common power source units 11 and 12 into AC power of an appropriate frequency and electric current and supply to servo motors 1 to 4, respectively, in response to command signals from power supply unit control processing units 31 to 34 of servo motor drive control device 30. Power supply units 21 to 24 have a function to measure the electric current supplied to servo motors 1 to 4, and measurement signals of the speed meters of servo motors 1 to 4 are input into power supply units 21 to 24, respectively. The measurement values of electric current and speed of servo motors 1 to 4 are input into power supply unit control processing units 31 to 34 of servo motor drive control device 30 through power supply units 21 to 24, respectively.

Power supply unit control processing units 31 to 34 of servo motor drive control device 30, which function mainly to output command signals of rotational speed to power supply units 21 to 24 of servo motors 1 to 4, is provided with individual electric power detection units 35 to 38, respectively, which function to calculate consumed electric power and regenerated electric power. The measurement values of the electric current and speed input from power supply units 21 to 24 are used for calculating consumed electric power and regenerated electric power in individual electric power detection units 35 to 38 as described later. However, the measurement values may be used for information display or control as required.

Servo motor drive control device 30 is further provided with a higher-level control processing unit 41 which perform control of operation timings of servo motors 1 to 4 depending on the product manufacturing process and the like, as well as the power supply unit control processing units 31 to 34 corresponding to servo motors 1 to 4, respectively.

In the configuration according to the present invention, the higher-level control processing unit 41 includes amplifier group electric power detection units 42 and 43 which function to calculate the consumed electric power and regenerated electric power of amplifier groups 15, 16 as a whole. Amplifier group electric power detection unit 42 uses data such as calculation results from individual electric power detection units 35 and 36 corresponding to power supply units 21 and 22 associated with corresponding amplifier group 15. Similarly, amplifier group electric power detection unit 43 uses data from individual electric power detection units 37 and 38.

Higher-level control processing unit 41 further includes an overall electric power detection unit 45 which functions to calculate consumed electric power and regenerated electric power of mechanical system 10 as a whole. Overall electric power detection unit 45 uses data from amplifier group electric power detection units 42 and 43.

Next, an operation of detecting consumed electric energy and regenerated electric energy according to this embodiment will be described. Although FIG. 1 shows a case where a total of two amplifier groups 15 and 16 and a total of four power supply units 21 to 24 are provided, the following description will be made on the assumption that an arbitrary number of amplifier groups and power supply units may be provided in the device. In view of this, "g" is used as an added number for amplifier groups 15 and 16 and takes the value of 1 to G (G=2 in the case shown in FIG. 1). Further, "k" is used as an added number for power supply units 21 to 24, and takes the value of 1 to N (N=4 in the case of FIG. 1).

Figure 2:
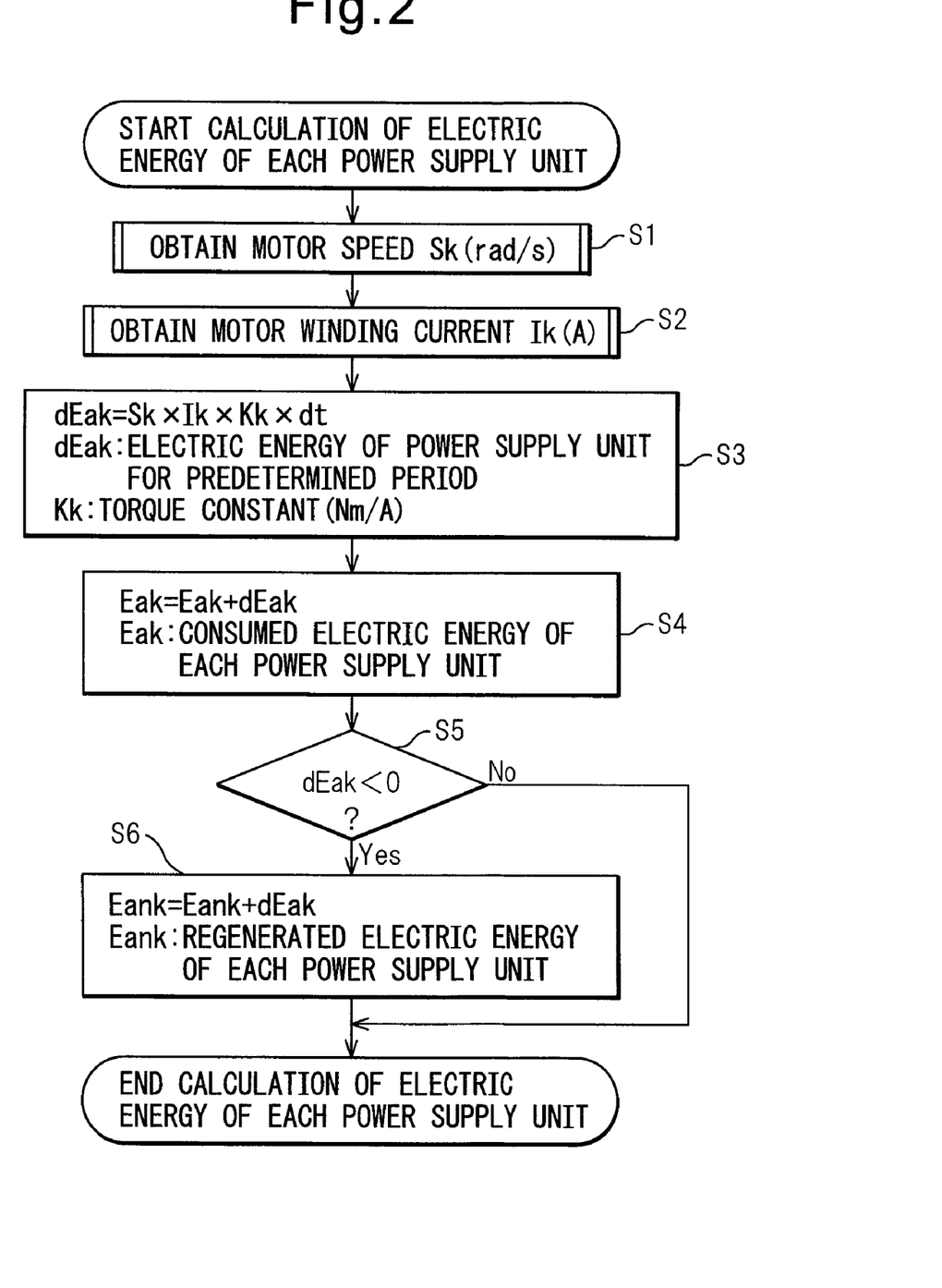
FIG. 2 is a flowchart showing a procedure for calculating electric power of each power supply unit of the servo motor drive control device.

FIG. 2 is a flowchart showing the detecting operation performed by the individual electric power detection units. In this embodiment, an electric current measurement value and a speed measurement value of a servo motor are sampled at predetermined period dt (s), and electric energy is calculated based on the sampled electric current measurement value and speed measurement value. FIG. 2 shows the operation performed during one cycle (the same is applied to flowcharts described below). The period dt is set to a sufficiently short time to regard the electric current and speed of the servo motor as constant. Further, although FIG. 2 shows the operation of any one of the servo motors (individual electric power detection units), the same operation is performed by all the servo motors.

First, at step S1, a motor speed Sk (rad/s) of each of the servo motors is obtained, and at step S2, a motor winding electric current Ik(A) of each of the servo motors is obtained. These values can be obtained, as described above, through the power supply units.

Then, at step S3, an electric energy (individual periodical electric energy) dEak (W·S) of each power supply unit for a particular period is calculated according to an equation dEak=Sk×Ik×Kk×dt, where Kk (Nm/A) is a torque constant for the corresponding servo motor. This equation calculates consumed electric energy by considering that a workload of a motor is equivalent to consumed electric energy. In accordance with the sign (the rotational direction and electric current direction in the motor) of Sk and Ik, the electric energy dEak takes a negative value when the corresponding servo motor performs a regenerating operation, i.e., an operation of generating power and returning it to the common power source unit through the power supply unit.

Then, at step S4, electric energy (individual electric energy) Eak (W·S) integrated over a predetermined time length is determined according to an equation Eak=Eak+dEak. Specifically, a value integrated over a predetermined time length can be determined by repeatedly adding the value of dEaK for every period to the value of Eak over the predetermined time length.

After that, at step S5, it is judged whether or not dEak is negative. As described above, dEak is negative when the corresponding servo motor performs the regenerating operation. If dEak is judged as negative at step S5, the process proceeds to step S6 where dEak is added to individual regenerated electric energy Eank (W·S). On the other hand, if dEak is not judged as negative, step S6 is skipped.

In this way, the detecting operation for one cycle in the individual electric power detection unit is completed. This operation is carried out repeatedly at every period dt over the predetermined time length, thereby determining the consumed electric energy and the regenerated electric energy of each servo motor for the particular time length as Eak and Eank.

Figure 3:
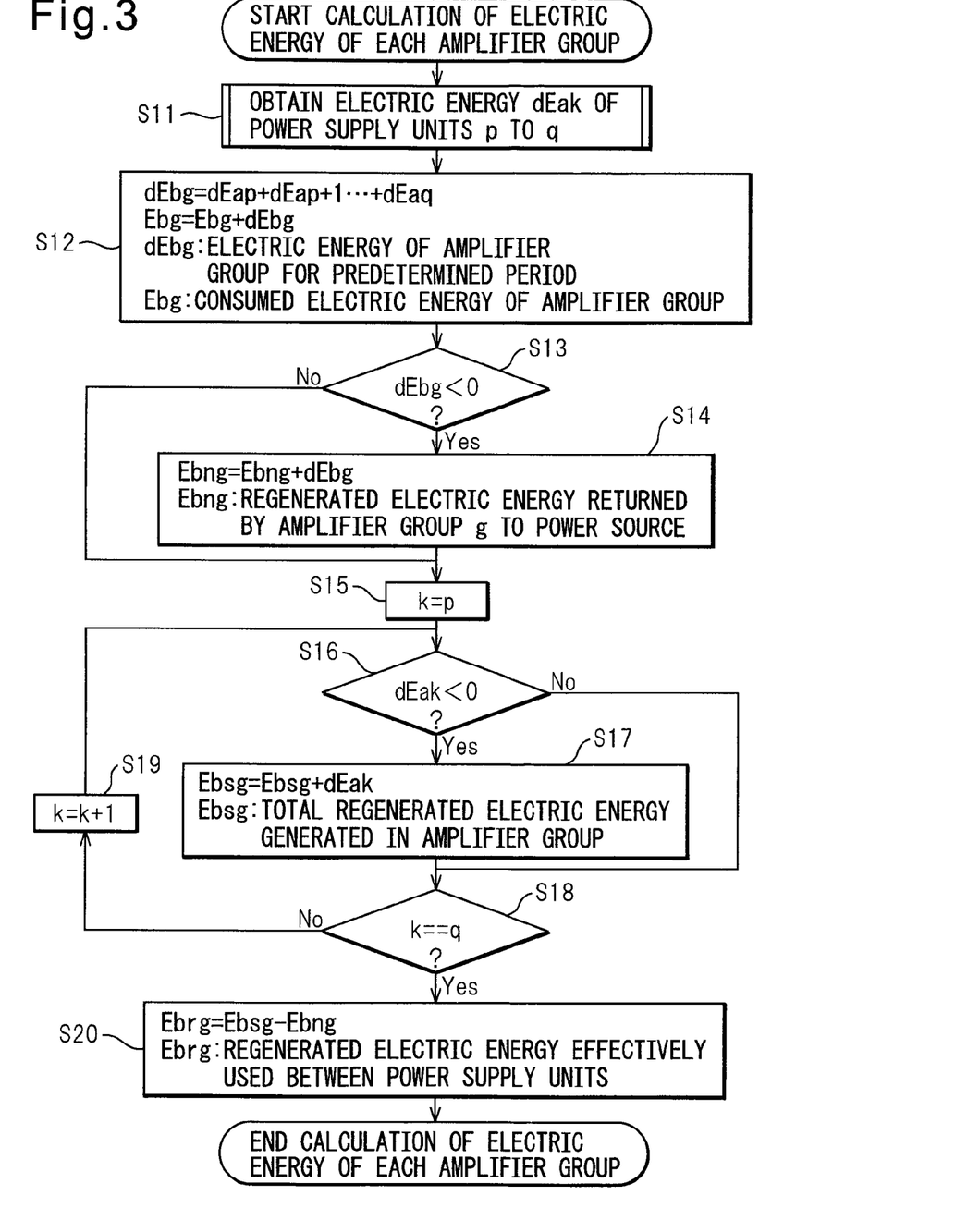
FIG. 3 is a flowchart showing a procedure for calculating electric power of each amplifier group of the servo motor drive control device.

FIG. 3 is a flowchart showing the detecting operation performed by the amplifier group electric power detection unit. Although FIG. 3 shows the operation of any one of the amplifier group electric power detection units, the same operation is performed by all the amplifier group electric power detection units.

At step S11, an electric energy dEak (k=p to q), for a particular period, of each of power supply units p to q associated with each amplifier group is obtained. These values can be obtained by performing a calculation in the corresponding individual electric power detection unit according to the operation shown in FIG. 2.

Then, at step S12, the electric energy dEak (k=p to q), for a particular period, of each of power supply units p to q associated with each amplifier group is totaled, thereby determining an electric energy (amplifier group periodic electric energy) dEbg of the amplifier group for the particular period. Further, dEbg is added to the amplifier group electric energy Ebg, i.e., the values of dEbg are integrated for a predetermined time length.

At step S13, it is judged whether or not dEbg is negative. The value of dEbg being negative means that the corresponding amplifier group as a whole generates regenerated power and returns it to the higher-level AC power source through the corresponding common power source. Therefore, if dEbg is judged as negative, the process proceeds to step S14 where dEbg is added to amplifier group regenerated electric energy Ebng. On the other hand, if dEbg is positive, step S14 is skipped.

In this process, the amplifier group regenerated electric power Ebng does not include the portion of the regenerated electric energy generated by the power supply units included in the corresponding amplifier group which is consumed in and effectively utilized by that amplifier group. Specifically, for example, in the case where one of power supply units 21 and 22 in amplifier group 15 shown in FIG. 1, for example, power supply unit 21 (servo motor 1 corresponding thereto) generates regenerated electric power while the other power supply unit 22 (servo motor 2 corresponding thereto) performs an operation which consumes electric power, the regenerated power from power supply unit 21 is first consumed by power supply unit 22. Therefore, for amplifier group 15 as a whole, only the remaining electric power, after subtracting the electric power consumed in power supply unit 22 from the regenerated electric power generated in power supply unit 21, is returned as regenerated electric power to AC power source from common power source unit 11. However, in the case where the regenerated electric power generated in power supply unit 21 is less than the electric power consumed in the other power supply unit 22, no regenerated electric power is generated for amplifier group 15 as a whole. In this case, the electric power supplied to amplifier group 15 through common power source unit 11 is less, by an amount equal to the regenerated electric power generated in power supply unit 21, than the electric power consumed in power supply unit 22.

In this embodiment, dEak representing electric power generated in each power supply unit 21 takes a negative value when regenerated electric power is generated. Therefore, the integrated regenerated electric energy Ebng can be determined, by adding dEak in the amplifier group at step S12, in consideration of the aforementioned consumption of the regenerated electric power in the amplifier group.

On the other hand, the following steps S15 to S19 constitute a routine for determining a total sum Ebsg of the regenerated electric energy generated in the power supply units included in each amplifier group. In this routine, first, at step S15, an initial value of a variable k for counting an added number for the power supply units is set to p on the assumption that the power supply units having the added numbers p to q are associated with each amplifier group.

Then, at step S16, it is judged whether or not the electric energy dEak consumed in the power supply unit having the added number k is negative, i.e., whether or not regenerated electric power is generated in that power supply unit. If dEak is negative, dEak is added, at step S17, to the total sum Ebsg of the regenerated electric energy in each amplifier group. On the other hand, if dEak is not negative, step S17 is skipped.

After that, at step S18, it is judged whether or not the variable k for counting the added number of the power supply unit corresponds to the last added number of the power supply unit associated with that amplifier group. If the variable k does not correspond to the last added number, k is incremented at step S19 and the process is returned to step S16. Specifically, the operations at steps S16, S17 are repeated for all the power supply units p to q associated with that amplifier group.

Then, at step S20, the amplifier group regenerated electric energy Ebng determined at step S14 is subtracted from the total sum Ebsg, as determined by the routine of steps S15 to S19, of the regenerated electric energy generated in the power supply units included in that amplifier group. A value Ebrg thus obtained corresponds to the portion of the regenerated electric energy generated in the power supply units included in that amplifier group which is consumed by the power supply units included in that amplifier group, i.e., the regenerated electric energy effectively used in that amplifier group.

Figure 4:
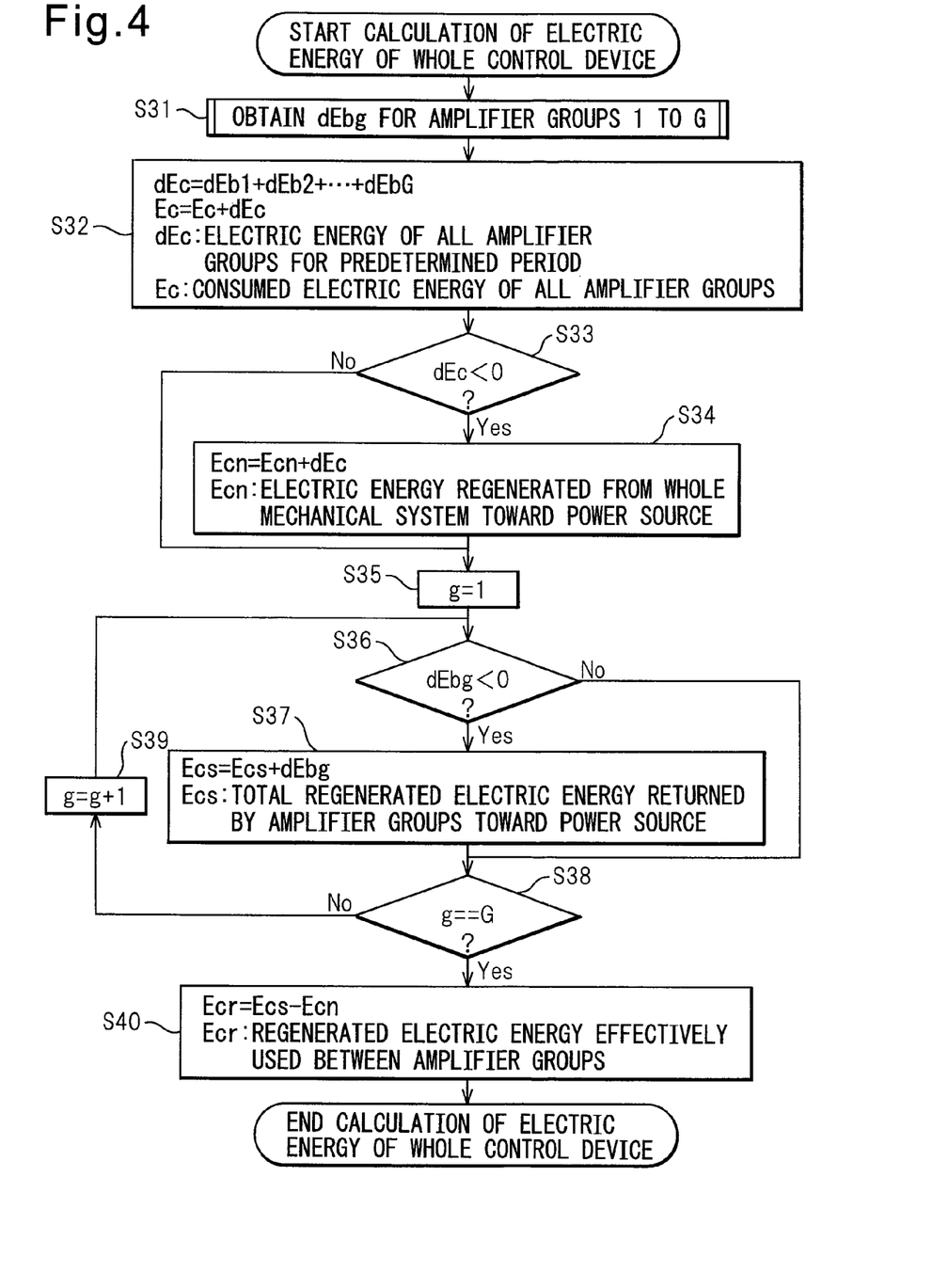
FIG. 4 is a flowchart showing a procedure for calculating electric power of a whole mechanical system of the servo motor drive control device.

FIG. 4 is a flowchart showing the detecting operation performed by the overall electric power detection unit.

First, at step S31, an electric energy dEbg of each of all the amplifier groups (g=1 to G) for a particular period is obtained. These values are obtained from the amplifier group electric power detection units.

Then, at step S32, the electric energy (overall periodic electric energy) dEc of the mechanical system as a whole for that period is determined by integrating the obtained electric energy dEbg of all the amplifier groups. Further, dEc is added to the overall electric energy Ec which is electric energy integrated over a predetermined period.

Then, at step S33, it is judged whether or not dEc is negative. At step S34, only if dEc is negative, dEc is integrated thereby to obtain the regenerated electric energy (overall regenerated electric energy) Ecn for a predetermined time length. Ecn does not include the portion of the regenerated electric power generated by each amplifier group which can be regarded to have been consumed by other amplifier groups. Specifically, in the case where regenerated electric power is generated by any of the amplifier groups while at the same time electric power is consumed by other amplifier groups, the regenerated electric energy dEc of the mechanical system as a whole is reduced by the amount equal to the consumed electric power. In the case where the consumed electric energy exceeds the regenerated electric energy, no regenerated electric power is generated in the mechanical system as a whole. This is because the electric energy dEc of the mechanical system as a whole is determined at step S32 by addition of the generated electric power dEak of each amplifier group which can takes a negative value.

On the other hand, steps S35 to S39 constitute a routine for determining a total sum Ecs of the regenerated electric energy generated in all the amplifier groups included in the mechanical system. In this routine, first, at step S35, an initial value of a variable g for counting an added number for the amplifier groups is set to 1.

Then, at step S36, it is judged whether or not the electric energy dEbg consumed in the amplifier group having the added number g is negative, i.e., whether or not regenerated electric power is generated in that amplifier group. At step S37, only if dEbg is negative, dEbg is integrated with the total sum Ecs of the regenerated electric energy generated in all the amplifier groups. Then, by judging at step S38 whether or not the variable g has reached the total number G of the amplifier groups and incrementing g at step S39, the operation of steps S36 and S37 is repeated for all the amplifier groups of g=1 to G.

After that, at step S40, the regenerated electric energy Ecn determined at step S34 is subtracted from the total sum Ecs, as determined by the routine of steps S35 to S39, of the regenerated electric energy generated in all the amplifier groups. The resulting Ecr corresponds to the portion of the regenerated electric energy generated in all the amplifier groups which has been consumed by exchange between the amplifier groups, i.e., which can be regarded to have been effectively used.

According to the embodiment described above, the regenerated electric energy Ebng in each amplifier group and the regenerated electric energy Ebrg used by exchange between the power supply units in each amplifier group can be determined in accordance with the power supply configuration. The result of this operation is used in addition to the result of detecting the regenerated electric energy of each servo motor (each power supply unit) or the whole mechanical system as in the prior art, thereby making it possible to evaluate, in more detail and for each amplifier group, the way in which and the degree to which the regenerating operation has contributed to the reduction of consumed electric power. This evaluation is useful for advertisement of mechanical system products, and from the viewpoint of effective use of electric power, can be used to optimize component devices of the mechanical system or the manufacturing process and the control program executed by the mechanical system.

Please note that the embodiment described above illustrates the present invention and various modifications can be made without departing from the scope of the present invention defined in the appended claims. For example, individual electric power detection units 35 to 38 may be configured to obtain the consumed electric power and the regenerated electric power of servo motors 1 to 4 from detection signals of the watt meter.

Further, while each common power source unit in the embodiment described above has the configuration which can perform the regenerating operation in which electric power is returned to the higher-level AC power source, the mechanical system may include a common power source which does not perform such a regenerating operation. In this case, a regeneration resistance is used to dispose of the regenerated electric power generated in the power supply unit connected to the common power source which does not perform the regenerating operation.

Figure 5:
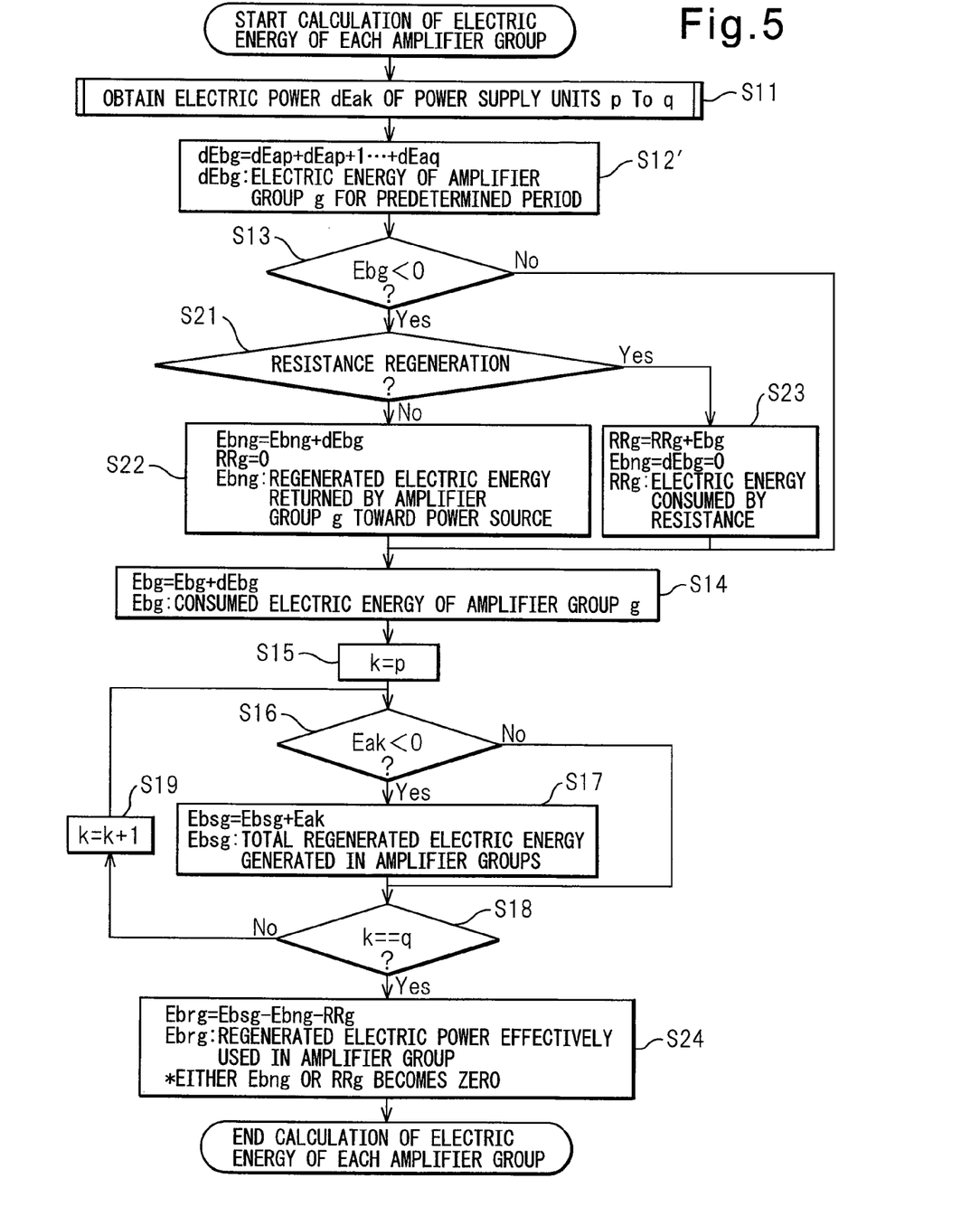
FIG. 5 is a flowchart showing a variation of the procedure for calculating electric power of each amplifier group shown in FIG. 3.

When the power supply unit which involves the resistance regeneration as described above is included in the mechanical system, a part of the procedure for detecting electric energy of each amplifier group shown in FIG. 3, in the operation of detecting the consumed electric energy and the regenerated electric energy as explained in the embodiment described above, is required to be corrected. FIG. 5 shows a flowchart in which such a correction is carried out. In this flowchart, the same component parts as those of FIG. 3 are denoted by the same reference numerals and the detailed description thereof will be omitted.

According to the flowchart shown in FIG. 5, the operation indicated by steps S12' and S21 to S23 is performed instead of steps S12 and S14 shown in FIG. 3. At step S21, it is judged whether or not each amplifier group involves the resistance regeneration.

If the amplifier group does not involve the resistance regeneration, i.e., the amplifier group can perform the regenerating operation in which electric power is returned to the higher-level AC power, at step S22, as in step S14 of FIG. 3, dEbg is integrated with the integrated regenerated electric energy Ebng of the amplifier group. At this time, RRg described later is set to zero.

On the other hand, if the amplifier group involves the resistance regeneration, at step S23, dEbg is integrated with the electric energy RRg (the integrated value over a predetermined time length) consumed by the regeneration resistance. Since the regenerating operation is not performed at this time, the integrated regenerated electric energy Ebng is set to zero. Further, the electric energy dEbg is set to zero in the period when it is judged at step 13 that the electric energy dEbg is negative, i.e., the regenerated power is generated in the amplifier group as a whole. This is reflected in the calculation of the subsequent step S14 and steps S32 and S37 in the flowchart of FIG. 4 thereby to carry out the proper calculation.

Further, in the flowchart of FIG. 5, the operation indicated by step S24 is performed instead of step S20 shown in FIG. 3. Specifically, if the resistance regeneration is involved, the electric energy RRg consumed by the regeneration resistance is used instead of the regenerated electric energy Ebngb of the amplifier group as a whole to calculate the regenerated electric energy Ebrg effectively used in that amplifier group. Please note that although step S24 is described to subtract both Ebng and RRg, only one of them is actually subtracted in view of the fact that one of Ebng and RRg is set to zero by the operation of steps S21 to S23. On the other hand, if the resistance regeneration is not involved, Ebng is subtracted in step S24 like in step S20 shown in FIG. 3.

What is claimed is:

1. A servo motor drive control device controlling servo motors of a mechanical system, said mechanical system including a plurality of amplifier groups each having a common power source unit connected to a higher-level power source and a plurality of power supply units for supplying power to the servo motors from the common power source unit, said servo motor drive control device further comprising:

an individual electric power detection unit determining, at every predetermined period, an individual periodic electric energy representing an electric energy of the servo motor operating in that period; and an amplifier group electric power detection unit determining an electric energy of each of the amplifier groups, wherein the individual periodic electric energy takes a positive value when the servo motor consumes electric power and takes a negative value when the servo motor regenerates electric power; and wherein each amplifier group electric power detection unit totals the individual periodical electric energy of the servo motors connected to the power supply units associated with the amplifier group corresponding to each amplifier group electric power detection unit thereby to determine an amplifier group periodic electric energy representing a consumed electric energy or a regenerated electric energy in the corresponding amplifier group and integrates the determined amplifier group periodic electric energy over a predetermined time length thereby to determine an amplifier group consumed electric energy representing a total consumed electric energy in the amplifier group during the predetermined time length, and wherein each amplifier group electric power detection unit integrates the amplifier group periodic electric energy, only when the amplifier group electric energy is negative, over the predetermined time length thereby to determine an amplifier group regenerated electric energy representing a total sum of the regenerated electric energy in the amplifier group corresponding to the amplifier group electric power detection unit for the predetermined time length.

2. The servo motor drive control device according to claim 1, wherein the amplifier group electric power detection unit totals the individual periodic electric energy of the servo motors connected to the power supply units associated with the amplifier group corresponding to the amplifier group electric power detection unit only when the individual periodic electric energy is negative, further subtracts the amplifier group regenerated electric energy from the electric energy obtained by integrating over the predetermined time length, thereby determining the regenerated electric energy transferred between the servo motors in the amplifier group.

3. The servo motor drive control device according to claim 1, wherein the individual electric power detection unit determines the individual periodic electric energy based on a measurement value of a current flowing through the servo motor and a measurement value of a rotational speed of the servo motor.

4. The servo motor drive control device according to claim 1, wherein the individual electric power detection unit integrates the individual periodic electric energy over the predetermined time length thereby to determine an individual consumed electric energy representing a total consumed electric energy of the servo motor corresponding to the individual electric power detection unit for the predetermined time length, and integrates the individual periodic electric energy, only when the individual periodic electric energy is negative, for the predetermined time length thereby to determine an individual regenerated electric energy representing a total sum of the regenerated electric energy of the servo motor over the predetermined time length.

5. The servo motor drive control device according to claim 1, further comprising an overall electric power detection unit, wherein the overall electric power detection unit totals the amplifier group periodic electric energy of all the amplifier groups thereby to determine an overall periodic electric energy and integrates the determined overall periodic electric energy over the predetermined time length thereby to determine an overall consumed electric energy; integrates the determined overall periodic electric energy, only when the overall periodic electric energy is negative, over the predetermined time length thereby to determine an overall regenerated electric energy; and totals the amplifier group periodic electric energy only when the amplifier group periodic electric energy is negative, further subtracts the overall regenerated electric energy from the electric energy obtained by integrating over the predetermined time length, thereby determining an regenerated electric energy transferred between the amplifier groups.

6. The servo motor drive control device according to claim 5, wherein the common power source units include a common power source unit not performing the regenerating operation by which electric power is returned to the higher-level power source, and with respect to the amplifier group associated with the common power supply unit not performing the regenerating operation, the amplifier group periodic electric energy thereof is set to zero when the amplifier group periodic electric energy thereof is negative, and then calculates the overall consumed electric energy and the regenerated electric energy transferred between the amplifier groups.

* * * * *